(12) United States Patent
Kärkkäinen et al.

(10) Patent No.: US 11,424,919 B2
(45) Date of Patent: Aug. 23, 2022

(54) PROTECTING USAGE OF KEY STORE CONTENT

(71) Applicant: Gurulogic Microsystems Oy, Turku (FI)

(72) Inventors: Tuomas Kärkkäinen, Turku (FI); Ossi Kalevo, Akaa (FI); Mikko Sahlbom, Pernio (FI)

(73) Assignee: Gurulogic Microsystems Oy, Turku (FI)

( * ) Notice: Subject to any disclaimer, the term of this patent is extended or adjusted under 35 U.S.C. 154(b) by 154 days.

(21) Appl. No.: 16/464,454

(22) PCT Filed: Dec. 1, 2017

(86) PCT No.: PCT/EP2017/025349
§ 371 (c)(1),
(2) Date: May 28, 2019

(87) PCT Pub. No.: WO2018/099606
PCT Pub. Date: Jun. 7, 2018

(65) Prior Publication Data
US 2019/0379537 A1 Dec. 12, 2019

(30) Foreign Application Priority Data
Dec. 2, 2016 (GB) .................................. 1620553

(51) Int. Cl.
*H04L 9/08* (2006.01)
*G06F 21/62* (2013.01)
*H04L 9/30* (2006.01)

(52) U.S. Cl.
CPC ........ *H04L 9/0861* (2013.01); *G06F 21/6218* (2013.01); *H04L 9/088* (2013.01); *H04L 9/30* (2013.01)

(58) Field of Classification Search
CPC ......... H04L 9/0861; H04L 9/088; H04L 9/30; H04W 12/35; H04W 12/04;
(Continued)

(56) References Cited

U.S. PATENT DOCUMENTS 6,704,871 B1 * 3/2004 Kaplan ................... G06F 21/72
713/192
8,983,067 B2 * 3/2015 Murray .............. H04N 21/4623
380/44
(Continued)

FOREIGN PATENT DOCUMENTS

EP      1836640 A2   9/2007
RU      2599538 C2   10/2016
(Continued)

OTHER PUBLICATIONS

European Patent Office, Communication under Rule 71(3) EPC, Application No. 17837851.9-1218, dated Jun. 17, 2020, 7 Pages.
(Continued)

*Primary Examiner* — Carl G Colin
*Assistant Examiner* — Han Yang
(74) *Attorney, Agent, or Firm* — Ziegler IP Law Group, LLC

(57) ABSTRACT

Protecting usage of key store content at a given user device of an end user includes receiving the key store content at the given user device. The key store content includes key materials encrypted using encryption credentials compatible with the given user device. The key store content is in a format compatible with the given user device. The encrypted key materials of the key store content are imported to a protected key store of the given user device, wherein all the key materials of the key store content are imported at one go. The key materials are stored at the protected key store in the encrypted form, and are non-exportable from the key store.
(Continued)

Internally within the protected key store, one or more key store integrated services of the given user device are allowed to access the non-exportable key materials for use, via key references only.

34 Claims, 4 Drawing Sheets

(58) Field of Classification Search
CPC .. G06F 21/6218; G06F 21/6209; G06F 21/45; G06F 21/6281
See application file for complete search history.

(56) References Cited

U.S. PATENT DOCUMENTS

| | | | |
|---|---|---|---|
| RE45,697 E * | 9/2015 | Lin | G11C 16/3418 |
| 9,396,325 B2 | 7/2016 | Kendall | |
| 2004/0247116 A1* | 12/2004 | Boren | H04L 9/0662 380/37 |
| 2006/0242068 A1 | 10/2006 | Jogand-Coulomb et al. | |
| 2007/0168292 A1* | 7/2007 | Jogand-Coulomb | G06F 21/6218 705/52 |
| 2008/0075047 A1* | 3/2008 | Shankara | H04L 47/50 370/337 |
| 2009/0067624 A1* | 3/2009 | Cobelo | G06F 21/78 380/46 |
| 2014/0208100 A1* | 7/2014 | Kendall | H04L 9/0863 713/164 |
| 2017/0331795 A1* | 11/2017 | Martin | H04L 9/0891 |
| 2020/0099674 A1* | 3/2020 | Campagna | H04L 63/0807 |

FOREIGN PATENT DOCUMENTS

| | | |
|---|---|---|
| WO | 2006/069194 A2 | 6/2006 |
| WO | 2006069194 A2 | 6/2006 |

OTHER PUBLICATIONS

International Preliminary Report on Patentability received for International Patent Application No. PCT/EP2015/025349, dated Feb. 20, 2019, 9 pages.
"Advanced Encryption Standard (AES)", Wikipedia, retrieved on May 14, 2019, 13 pages. Available at: https://en.wikipedia.org/wiki/Advanced_Encryption_Standard.
"Android Keystore System", Android Developers, retrieved on May 15, 2017, 11 pages. Available at: https://developer.android.com/training/articles/keystore.html.
Sabt, Mohamed, et al., "Breaking Into the KeyStore: A Practical Forgery Attack Against Android KeyStore", 21st European Symposium on Research in Computer Security (ESORICS 2016), Sep. 23-30, 2016, 22 pages.
"How to Import Serial Keys from CSV file", StoreApps, retrieved on Feb. 26, 2019, 3 pages. Available at: https://www.storeapps.org/docs/wcsk-how-to-import-serial-keys-from-csv-file/.
"Trusted execution environment (TEE)", Wikipedia, retrieved on May 14, 2019, 9 pages. Available at: https://en.wikipedia.org/wiki/Trusted_execution_environment.
GB Intellectual Property Office, Combined Search and Examination Report under Sections 17 and 18(3), Application No. GB1620553.6, dated May 4, 2017, 6 pages.
GB Intellectual Property Office, Examination Report under Section 18(3) Application No. GB 1620553.6, dated Nov. 15, 2017, 3 pages.
GB Intellectual Property Office, Intention to Grant under Section 18(4), Application No. GB1620553.6, dated Sep. 26, 2018, 2 pages.
Patent Office of the Russian Federation, Decision to Grant, Application No. 2019116964/07, dated Nov. 9, 2020, 12 pages, English translation attached, 2 pages.
Unknown "Android Keystore System" Android Developers, https://developer.android.com/training/articles/keystore.html, accessed on May 3, 2017, 11 pages.
China Patent Office, First Office Action, Application No. 201780072591.5, dated Apr. 15, 2021, 35 pages, English Summary Attached, 2 pages.
Mohamed Sabt et al, "Breaking into the KeyStore: A Practical Forgery Attack Against Android KeyStore" 21st European Symposium on Research in Computer Security (ESORICS 2016), 22 pages.
Ratnakar, "Import Different CSV File of Serial Keys for Different Products" StoreApps, Woo Commerce, XP055461145, https://www.storeapps.org/import-different-csv-files-of-serial-keys-for-different-products//, retrieved May 21, 2021, Last updated on Feb. 9, 2020, 5 pages.
"How to import Serial Keys from CSV file-Store Apps", Woo Commerce, XP 055461145, Store Apps, https://www.storeapps.org/docs/wcsk-how-to-import-serial-keys-from-csv-file/, Apr. 21, 2016, retrieved Jun. 23, 2021, 6 pages.

* cited by examiner

PROTECTING USAGE OF KEY STORE CONTENT

TECHNICAL FIELD

The present disclosure relates to systems for protecting usage of key store content at user devices of end users, for example, to data security systems that are reliant upon using key materials to achieve data security. Moreover, the present disclosure also relates to methods of protecting usage of key store content at user devices of end users. Furthermore, the present disclosure also relates to computer program products comprising a non-transitory computer-readable storage medium having computer-readable instructions stored thereon, the computer-readable instructions being executable by a computerized device comprising processing hardware to execute the aforementioned methods.

BACKGROUND

There often arises a need to store user-sensitive data on user devices, because there are presently available various services and functionalities that are designed to run as software applications on user devices, for example software applications for making payments. As a first example, there are presently available multiple applications for banking and payment services, wherein the multiple applications require secure arrangements for maintaining strong protection for customers when using the banking and payment services in order to try to avoid malicious third parties from hacking into such services for stealing money. As a second example, a user may need to store secret or private keys to access protected e-mails. For these and many other reasons, it is very desirable to provide a robust solution for handling key store pertaining to key materials.

There are many security service providers that are accessible via multiple "eco-system" platforms, whose key stores are based on software. For example, the Android™ eco-system platform is contemporarily much in public focus, because there are numerous examples of mobile devices worldwide, for example tablet-like computing devices, that utilize the Android™ eco-system platform. Referring to Google documents, the Android™ Keystore system stores cryptographic keys in a container to make it more difficult to extract from a given Android-compatible device. The Android™ Keystore system is most advanced amongst contemporarily available key store systems in security matters, but still unfortunately lacks very important functionalities needed to provide an efficient security solution in contemporary devices that are sold in large numbers in the market. The Android™ Keystore offers a substantially complete set of security algorithms, for example, such as crypto, key generator, key factory, key pair generator, mac, and signature. All of these services run inside hardware that is backed by the key store system to make it efficient and convenient to use, but there is not taken into account real world cryptographic requirements.

Moreover, in only a few years, there have recently been a huge increase in the use of mobile phones, and there are multiple vendors with different sets of device models, which are powered by different eco-systems, for example, such as Google® Android™, Apple® iOS™, Microsoft® Windows®, and so on. There arises an issue from a security perspective in that every eco-system has its own security solutions to protect user-sensitive data in hardware-based or software-based key stores. This makes it very difficult for application developers to understand security related implementations even theoretically, although it is understood at a basic level. Almost every eco-system has its own key store solution, but from a point of current urgent need, it is desired to focus on mobile platforms, because almost every human will soon have some kind of smartphone and a great amount of different applications that require properly implemented key stores for holding user-sensitive key materials inside. On paper, key stores almost fulfill any known security issues, but in reality their software implementations do not meet the solid solutions with the System on Chip (SoC) hardware design.

Firstly, the Android™ Keystore is not designed to import thousands or millions of secret keys (namely, key materials), but has been designed to maintain only a few secret keys. The Android™ Keystore has been designed for a scenario where the same key(s) are used for encryption purposes again and again. Secondly, the Android™ Keystore supports importing only one plain raw key at a time, which is potentially exposed to malicious parties. This is because the security of the Android™ Keystore is based on asymmetric encryption, which is a very slow computation process.

Moreover, there are some conventionally-known software-based key store solutions, from which "Bouncy Castle" alias "BC" is the most known provider. When compared to the hardware-based Android™ Keystore, BC supports key store import functionality for protected key materials in Abstract Syntax Notation One (ASN.1) format, which can import securely more than one key at a time into the key store. The main problem with BC is that, the key material is not completely protected against extraction prevention, because the key material is requested from outside of the key store and is provided to another software application that then uses the key material. This makes it possible for a malicious third party to retrieve a key material from the key store in connection with an authenticated request. In particular, the key materials are not indexed in a given BC's key store, which potentially forces revealing the sensitive key materials to malicious parties.

In a published United States patent document US 2014/0208100 A1 (H. Richard Kendall; "Provisioning an App on a Device and Implementing a Keystore"), there is described a method of installing a keystore in a mobile app. The app prompts a user to enter a passphrase to create an app keystore. The Keystore has a user section and a Table of Contents (TOC). The files in the Keystore are hashed, creating "first" key store hash values. The first keystore hash values are stored in the TOC. The TOC is hashed to create a TOC hash value. The passphrase entered by the user is then combined with the TOC hash value. This creates a "first" master passphrase for the keystore. The keystore is then transmitted to the device where it is installed in generic (non-provisioned) wrapped app.

In a published technical document (Woo Commerce: "How to Import Serial Keys from CSV file—StoreApps", Apr. 21, 2016 (2016-04-21), XP055461145), a technical overview of an import of serial keys from a CSV file is described. The method includes creating of a CSV file consisting of serial key text to be distributed among customers. The created CSV file is then imported to WooCommerce Serial Key dashboard. Once imported, the CSV file is validated and information of how many serial keys have been imported and ones that are skipped is shown in a table.

In another published technical document (Mohamed Sabt et al; "Breaking into the KeyStore: A Practical Forgery Attack Against Android KeyStore"), a technical overview of security of an Android KeyStore is described.

The document proves that use of non-provably secure cryptographic schemes in complex architectures could cause severe consequences. The document further proves the Authenticated Encryption (AE) scheme Hash-then-CBC-Encrypt does not provide authenticity regardless of the used hash function. Document also presents a selective forgery attack where an adversary exploits this weakness to substantially reduce the length of the symmetric keys protected by the KeyStore.

SUMMARY

The present disclosure seeks to provide an improved system for protecting usage of key store content at a given user device of an end user.

Moreover, the present disclosure seeks to provide an improved method of protecting usage of key store content at a given user device of an end user.

A further aim of the present disclosure is to at least partially overcome at least some of the problems of the prior art, as discussed above.

In a first aspect, embodiments of the present disclosure provide a method of protecting usage of key store content at a given user device of an end user, characterized in that the method includes steps of:
(i) receiving, at the given user device, the key store content including key materials that are encrypted using encryption credentials compatible with the given user device, the key store content being created by and received from a key service provider in a format that is compatible with the given user device;
(ii) importing the encrypted key materials of the key store content to a protected key store of the given user device and storing the key materials at the protected key store in the encrypted form, wherein all the encrypted key materials of the key store content are imported at one go,
—wherein the key store content is stored at the key store in a manner that the key materials are non-exportable from the key store, and wherein keys are generated from the encrypted key materials using:
key offsets,
bit offsets, and/or
byte offsets; and
(iii) internally within the protected key store of the given user device, allowing one or more key store integrated services of the given user device to access the non-exportable key materials for use via key references only.

Embodiments of the present disclosure are of advantage in that complete protection of the key store content against unauthorized access is facilitated by employing a complete end-to-end process from the key service provider to the given user device of the end user, wherein the key materials of the key store content are never exposed or treated unsafely at any step in the process, are non-exportable once stored at the protected key store of the given user device, and are accessible for use by the services that are integrated with the protected key store, via the key references only.

In a second aspect, embodiments of the present disclosure provide a computer program product comprising a non-transitory computer-readable storage medium having computer-readable instructions stored thereon, the computer-readable instructions being executable by a computerized device comprising processing hardware to execute the method pursuant to the aforementioned first aspect.

In a third aspect, embodiments of the present disclosure provide a system for protecting usage of key store content at a given user device of an end user, characterized in that the system is operable to:
(i) receive, at the given user device, the key store content including key materials that are encrypted using encryption credentials compatible with the given user device, the key store content being created by and received from a key service provider in a format that is compatible with the given user device;
(ii) import the encrypted key materials of the key store content to a protected key store of the given user device and store the key materials at the protected key store in the encrypted form, wherein all the key encrypted materials of the key store content are imported at one go, wherein the key store content is stored at the key store in a manner that the key materials are non-exportable from the key store, and wherein keys are generated from the encrypted key materials using:
key offsets,
bit offsets, and/or
byte offsets; and
(ii) internally within the protected key store of the given user device, allow one or more key store integrated services of the given user device to access the non-exportable key materials for use via key references only.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and apparatus disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1A:
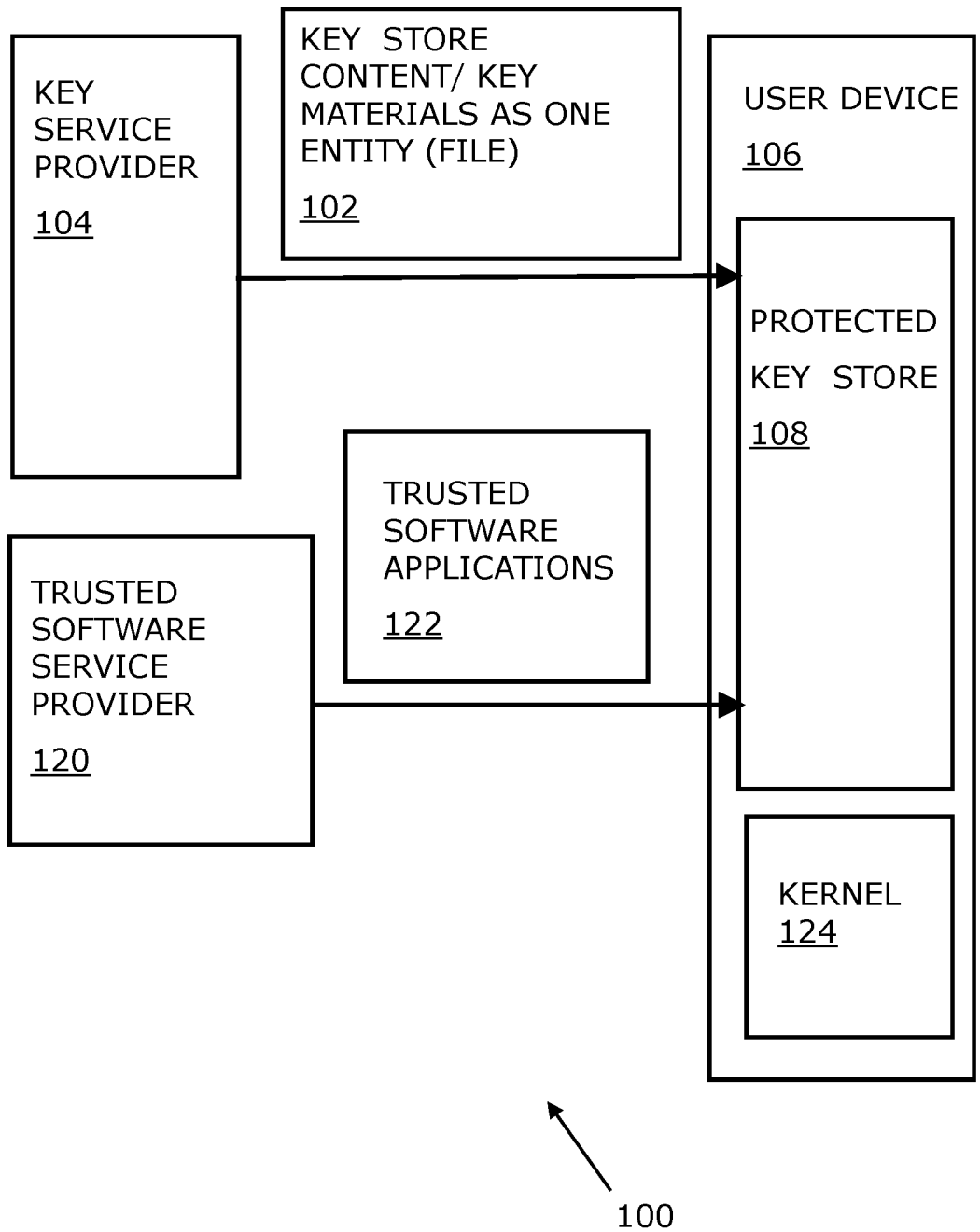
FIG. 1A is a schematic illustration of a system for protecting usage of key store content at a given user device of an end user, in accordance with an embodiment of the present disclosure.

In the accompanying drawings, an underlined number is employed to represent an item over which the underlined number is positioned or an item to which the underlined number is adjacent. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, embodiments of the present disclosure provide a method of protecting usage of key store content at a given user device of an end user, characterized in that the method includes steps of:
(i) receiving, at the given user device, the key store content including key materials that are encrypted using encryption credentials compatible with the given user device, the key store content being created by and received from a key service provider in a format that is compatible with the given user device;
(ii) importing the encrypted key materials of the key store content to a protected key store of the given user device and storing the key materials at the protected key store in the encrypted form, wherein all the encrypted key materials of the key store content are imported at one go, wherein the key store content is stored at the key store in a manner that the key materials are non-exportable from the key store, and wherein keys are generated from the encrypted key materials using:
key offsets,
bit offsets, and/or
byte offsets; and
(iii) internally within the protected key store of the given user device, allowing one or more key store integrated services of the given user device to access the non-exportable key materials for use via key references only.

Optionally, in addition to the key materials, the protected key store also includes information about the end user and/or a group of end users that are authorized to use the key materials stored at the protected key store. Additionally or alternatively, optionally, the protected key store includes other information relevant for usage of the key materials.

Throughout the present disclosure, the term "end user" encompasses a human user as well as a machine. As an example, the end user could be a registered relay machine. This is particularly beneficial for cases where the aforementioned method is used to recognize and verify servers that perform machine-to-machine communication.

It will be appreciated that the key store is protected only for its usage by the end user, namely against unauthorized usage by anyone other than the authorized end user, and such protection of the key store is not related to the encryption of the imported key materials. In other words, the key materials are encrypted using one or more different secret keys, for example, such as one or more pre-shared keys.

Optionally, the key materials are received at the step (i) in a symmetrically-encrypted form. Optionally, in this regard, the key materials are encrypted using symmetric keys.

Optionally, the method includes, internally within the protected key store of the given user device, decrypting one or more of the key materials to be used by the one or more key store integrated services of the given user device.

Throughout the present disclosure, the term "key reference" generally refers to a given reference that refers to and identifies a given key material stored at the protected key store. In other words, with a given key reference, it is known which key material (for example, a key or a certificate) is to be used, and optionally, in which location of the protected key store the key material to be used is located. Pursuant to embodiments of the present disclosure, the key material itself is never extracted from the key store.

According to an embodiment, the key references are implemented by way of indices of the key materials. Optionally, the indices are ordinal numbers of the key materials in an order of their occurrence. Optionally, the method includes receiving, within the key store content, the indices to be used for referencing the key materials via the key references. Alternatively, optionally, the method includes generating, at the given user device, the indices to be used for referencing the key materials via the key references. As an example, the indices may be generated in a consecutive manner corresponding to an order in which the key materials are included in the key store content. The indices can be generated, for example, at an initial registration of the given user device to the key service provider or during the decryption of the key materials.

According to another embodiment, the key references are implemented by way of offsets based upon which the key materials are to be identified. It will be appreciated that a given offset refers to and identifies a given key material stored at the protected key store. Some examples of the offsets have been provided later for illustration purposes.

Pursuant to embodiments of the present disclosure, complete protection of the key store content against unauthorized access is facilitated by employing a complete end-to-end process from the key service provider to the given user device of the end user, wherein the key materials of the key store content are never exposed or treated unsafely at any step in the process. The key store content is created and delivered to the given user device in the encrypted form. This potentially prevents eavesdropping by third parties. At the given user device, the key store content is imported to the key store of the given user device at one go.

Optionally, the key store content is received as a single list containing all the key materials (hereafter referred to as the "key code list", for the sake of convenience only). Alternatively, optionally, the key store content is received as a plurality of key code lists. It will be appreciated that the plurality of key code lists can be imported simultaneously. Irrespective of the form in which different key code lists, namely the key materials, are encrypted, all the key materials are imported at one go.

Optionally, at the step (ii), the key store content is imported to the given user device as a single data file. It will be appreciated that the number of key materials included within the key store content can be as large as thousands, potentially millions. In such a case, importing the key store content as a single data file has several advantages, as compared to conventional key store techniques.

For illustration purposes only, there will now be considered an example implementation of the aforementioned system with Gurulogic Microsystem Oy's proprietary product "Starwindow". In such an implementation, once the key store content is received at the given user device, a "Load" function provided by a key store of the "Starwindow" product is used to import all the key materials to the key store at one go. Optionally, the "Load" function also decrypts the key materials securely within the key store to enable fast usage thereof. It will be appreciated that the "Load" function can be used to import all the key materials at one go, even when there are millions of key materials included in the key store content.

The aforementioned importing of a huge amount of key materials simultaneously is enabled by different implementation solutions, for example, such as the following options:

Option A:

A key code list comprises eight different 128-bit keys; this key code list consumes 128 bytes of a storage space. As the smallest unit size is one byte, which represents eight bits, a 128-bit key consumes 16 bytes of the storage space. It will be appreciated that the keys typically represent highest-possible entropy, thereby strengthening the protection achieved therefrom, and therefore these keys cannot be compressed with traditional compression techniques.

An example key code list may be represented as follows:
KeyCodeListA: array [0 . . . 7] of array [0 . . . 15] of UInt8=

(0×4B, 0×DA, 0×72, 0×44, 0×63, 0×12, 0×07, 0×43, 0×6F, 0×65, 0×83, 0×8C, 0×F5, 0×3F, 0×F1, 0×08, //key1

0×CA, 0×1E, 0×7F, 0×DF, 0×5C, 0×7F, 0×78, 0×0C, 0×55, 0×88, 0×96, 0×0B, 0×A9, 0×D9, 0×22, 0×6F, //key2

0×66, 0×43, 0×73, 0×84, 0×57, 0×86, 0×66, 0×F8, 0×79, 0×B0, 0'CC, 0×A0, 0×16, 0×13, 0×42, 0×DF, //key3

0×F0, 0×6B, 0×2B, 0×F8, 0×68, 0×5A, 0×31, 0×CF, 0×9A, 0×65, 0×F1, 0×C7, 0×94, 0×62, 0×DD, 0×9B, //key4

0×B1, 0×28, 0×68, 0×EE, 0×1B, 0×4D, 0×43, 0×07, 0×E4, 0×97, 0×FF, 0×00, 0×01, 0×FF, 0×00, 0×E0, //key5

0×EE, 0×1F, 0×FD, 0×A9, 0×69, 0×E5, 0×FF, 0×00, 0×DF, 0×67, 0×67, 0×F7

0×B0, 0×69, 0×AA, 0×77, //key6

0×9E, 0×55, 0×AC, 0×E3, 0×FE, 0×16, 0×27, 0×D9, 0×ED, 0×E1, 0×2B, 0×FF

0×00, 0×13, 0×FF, 0×00, //key7

0×65, 0×E2, 0×28, 0×56, 0×2D, 0×BF, 0×E9, 0×39, 0×1F, 0×F0, 0×74, 0×9F, 0×95, 0×19, 0×05, 0×07, //key8);

, wherein consecutive sequences of 16 bytes each represent the keys. In this example, the keys are generated based upon key offsets, namely by increasing the offsets by the size of the keys (which is 16 bytes in this example).

Optionally, the importing at one go is made by "compressing" the keys to be delivered. There are at least two different ways, namely options 1) "B" and "C", and 2) "D" to implement this:

Option B:

For illustration purposes only, the option "B" will now be described with respect to the same example key code list. Optionally, 128 keys (=8×16) are generated from the same key code list, by choosing the keys based upon byte offsets instead of key offsets. As an example, first three keys can be generated as follows:

KeyCodeListB : array [0 . . . 127] of UInt8=

(0×4B, 0×DA, 0×72, 0×44, 0×63, 0×12, 0×07, 0×43, 0×6F, 0×65, 0×83, 0×8C, 0×F5, 0×3F, 0×F1, 0×08, // key1 from a byte offset "0"

(0×DA, 0×72, 0×44, 0×63, 0×12, 0×07, 0×43, 0×6F, 0×65, 0×83, 0×8C, 0×F5, 0×3F, 0×F1, 0×08, 0×CA // key2 from a byte offset "1"

(0×72, 0×44, 0×63, 0×12, 0×07, 0×43, 0×6F, 0×65, 0×83, 0×8C, 0×F5, 0×3F, 0×F1, 0×08, 0×CA, 0×1E, // key3 from a byte offset "2"

It will be appreciated that the keys can be generated by selecting an offset in any predefined order, and is not necessarily always generated by increasing the offset by one as illustrated in the abovementioned example for the example key code list provided in the option "A".

Option C:

Using the same key code list, it is possible to generate 1024 keys (=8×16×8 keys) instead of the abovementioned eight (8) and 128 keys by choosing the keys based on bit offsets instead of key and byte offsets. For example, the first three 16-byte keys (generated in the option "B") can be converted to bits as follows:

(i) 0100 1011 1101 1010 0111 0010 0100 0100 1011 0011 0001 0010 0000 0111 0100 0011

0110 1111 0110 0101 1000 0011 1000 1100 1111 0101 0011 1111 1111 0001 0000 1000

1101 1010 0111 0010 0100 0100 1011 0011 0001 0010 0000 0111 0100 0011 0110 1111

0110 0101 1000 0011 1000 1100 1111 0101 0011 1111 1111 0001 0000 1000 1100 1010

0111 0010 0100 0100 1011 0011 0001 0010 0000 0111 0100 0011 0110 1111 0110 0101

1000 0011 1000 1100 1111 0101 0011 1111 1111 0001 0000 1000 1100 1010 0001 1110

(i) Thus, a first 128-bit key from a bit offset "0" is:
0100 1011 1101 1010 0111 0010 0100 0100 1011 0011 0001 0010 0000 0111 0100 0011

0110 1111 0110 0101 1000 0011 1000 1100 1111 0101 0011 1111 1111 0001 0000 1000 and a second 128-bit key from a bit offset "1" is:
1001 0111 1011 0100 1110 0100 1000 1001 0110 0110 0010 0100 0000 1110 1000 0110

1101 1110 1100 1011 0000 0111 0001 1001 1110 1010 0111 1111 1110 0010 0001 0001 and a third 128-bit key from a bit offset "2" is:
0010 1111 0110 1001 1100 1001 0001 0010 1100 1100 0100 1000 0001 1101 0000 1101

1011 1101 1001 0110 0000 1110 0011 0011 1101 0100 1111 1111 1100 0100 0010 0011

In other words, when compared to the original keys, this technique is capable of generating 128 times more keys with the same amount of key materials.

It will be appreciated that instead of using the aforementioned key offset, the aforementioned byte offset or the aforementioned bit offset, other type of offsets, for example, such as word offsets can also be used, depending on whether it is more important to increase the processing speed or to generate a larger amount of keys.

Option D:

According to an embodiment, 65535 keys are expanded in device memory of the given user device, for example, as follows:

(a) a 128-bit key is expanded to, for example, a 352-bit key;
(b) a 192-bit key is expanded to, for example, a 432-bit key; and
(c) a 256-bit key is expanded to, for example, a 512-bit key.

These keys can then be used in respect of the key store integrated services, for example, using algorithms such as AES, Salsa20 and ChaCha20, but not limited thereto.

The key materials may be used for various purposes, for example, such as cryptography, data protection (for example, encryption and decryption), signing, integrity, verification, authentication, authorization and similar. Advantageously, the key materials are made accessible for use, internally within the protected key store, to the key store integrated services, which access the key materials for use via the key references only. In other words, the key materials are not accessible by software applications or ecosystem processes from outside of the key store.

In an event that a malicious party makes an attempt to use a key reference to access, evaluate or debug its corresponding key material, an exception is optionally raised. As an example, if the key store is implemented on Android™ and technical interfaces are built using Java, where a technical implementation of security solutions is mixed between Sun Microsystem®'s Java and Google Android™'s Java, the key store should support exactly required interfaces defined in Google Android™ developer's reference, so that the technical implementation may be done using already existing Java Application Programming Interface (API). However, the technical implementation of the key store does not allow to access, evaluate or debug a key material referenced by a given key reference.

In embodiments of the present disclosure, the key store content is created by the key service provider, in the aforementioned format, namely in the format that is compatible with the given user device, so as to be compliant with an import function of the key store of the given user device. This remarkably speeds up the import procedure at the step (ii) at the given user device. Optionally, the key store content is created by the key service provider in a format that is compliant with a key-store import function of a wide spectrum of user devices; for example, the user devices employ various types of proprietary secure key stores implemented in hardware, such as aforementioned TEE, and employ a software-supported interface to provide a portal of standardized functionality presented by the secure key store to a received encrypted key store content file sent by the key service provider. Optionally, in this regard, at the key service provider, the key store content is individually customized to be compatible with various different types of user devices.

Examples of such user devices include, but are not limited to, mobile phones, smart telephones, Mobile Internet Devices (MIDs), tablet computers, Ultra-Mobile Personal Computers (UMPCs), phablet computers, Personal Digital Assistants (PDAs), web pads, Personal Computers (PCs), handheld PCs, laptop computers, desktop computers, and interactive entertainment devices, such as game consoles, Television (TV) sets and Set-Top Boxes (STBs).

Moreover, it will be appreciated that the key store of the given user device may be either hardware-based or software-based, for example implemented using hardware as in TEE ("trusted execution environment"), that prevents export of data therefrom after initial importing and loading of the key store content to the protected key store of the given user device.

According to an embodiment of the present disclosure, the key store is hardware-based. Optionally, in such a case, the importing at the step (ii) includes binding the key materials stored at the hardware-based key store to a secure area of processing hardware of the given user device. Subsequently, in use, key materials stored in the key store are accessed for use, via use of their references, but are not exportable from the key store. Optionally, a pointer is used to transfer a key reference of a key material to be used by a key store integrated service.

One or more trusted software applications, for example encryption algorithms and/or decryption algorithms that require use of the key materials in the key store are protected in operation by a kernel layer of the given user device. The kernel layer of the given user device, for example, is implemented in a mixture of hardware and software, and is often proprietary to the given user device, for example proprietary to a manufacturer of the given user device. The trusted software applications interface to other software applications supported in other software layers supported in operation on the given user device. Beneficially, the one or more trusted software applications are downloaded in encrypted form from a trusted software service provider. Optionally, the key service provider and the trusted software service provider are the same party. Alternatively, optionally, the key service provider and the trusted software service provider are mutually different parties.

Thus, it will be appreciated, in a given user device including a hardware-implemented key store, that there is also a kernel layer and one or more software layers hosted in the device. Software applications can be imported and then executed in the one or more software layers. Moreover, other trusted software applications provided by the trusted software service provider can be executed in the kernel layer, in which case the trusted software applications are protected by security provisions of the kernel layer that are generally more secure than the one or more software layers; the software applications protected by security provisions of the kernel layer are referred to as "key store integrated services" for purposes of the present disclosure. In operation, various data exchanges occur between applications supported in the one or more software layers and the "key store integrated services" hosted in the kernel layer.

Optionally, the secure area of the processing hardware is implemented by way of dedicated hardware that is configured to disallow externally-loaded software applications or programs, namely in the aforementioned one or more software layers, to operate on the dedicated hardware. It will be appreciated that such externally-loaded software applications or programs could be maliciously loaded by hostile third parties. More optionally, the secure area of the processing hardware is implemented by way of Trusted Execution Environment (TEE; see reference [1]), for example as aforementioned.

In this way, the method facilitates a solid and strong integration between software and security hardware of the given user device.

According to an embodiment of the present disclosure, the "key materials" include at least one of:
(a) secret keys for symmetric data encryption,
(b) private keys and public keys for a Public Key Infrastructure (PKI)-equivalent usage,
(c) certificates to be used for cryptography, signing, integrity, verification, authentication, authorization and similar,
(d) one or more key generators for generating keys.

Optionally, in this regard, the one or more key generators are used to generate the keys reproducibly. In other words, each time a same input is used, a same key is generated by a given key generator.

Optionally, one or more of the key materials are individually protected with additional encryption. This is particularly beneficial for certain security applications.

It will be appreciated that even if PKI as such uses asymmetric encryption, the key materials can still be imported using symmetric encryption.

Moreover, optionally, the key materials include disposable keys that are to be used only once and are to be discarded after use. Such disposable keys may, for example, be used for signing-in to a given service. Additionally or alternatively, optionally, at least some of the keys are reusable encryption keys.

Furthermore, optionally, the key store is capable of acting as a key generator, and is capable of generating new keys reproducibly.

Moreover, according to an embodiment of the present disclosure, the method includes integrating, with the key store, one or more trusted software applications or ecosystem processes hosted at the given user device that are authorized to use the key store of the given user device. Such integrated software applications or ecosystem processes are referred to as "key store integrated services" throughout the present disclosure, as aforementioned. Examples of the key store integrated services include, but are not limited to, data delivery services, content delivery services, banking services, and financial transaction services; such services typically involve encrypting and/or decrypting data using one or more keys.

Optionally, in this regard, the method includes importing, from the trusted software service provider, the one or more trusted software applications for providing key store integrated services, wherein the one or more trusted software applications when executed at the given user device are operable to provide one or more key store integrated services and are provided with protection from a kernel of the given user device.

Moreover, optionally, when the key store is hardware-based, the key materials are encrypted using symmetric encryption that is compliant with the hardware-based key store. Optionally, in this regard, the method includes encrypting the key materials, at the key service provider, by employing symmetric Advanced Encryption Standard (AES; see reference [2]) encryption, for example, using a 128-bit key or a 256-bit key.

Alternatively, optionally, when the key store is software based, the key store content is encrypted using asymmetric encryption that is compliant with the software-based key store.

It will be appreciated here that for the given user device to be able to decrypt the encrypted key store content, the encryption credentials used during encryption must be known to the given user device. It will be appreciated that it is not relevant in embodiments of the present disclosure, which encryption algorithm or which kind of encryption credentials are used to encrypt the key store content, because different device vendors and ecosystem providers may implement multiple different security solutions, which may then be implemented by multiple different security service providers on different platforms with their own hardware-based or software-based key stores.

Moreover, as mentioned previously, the encryption credentials that were used to encrypt the key materials are compatible with the given user device. Such compatible encryption credentials may be provided by the given user device or by the key service provider. Optionally, in this regard, the method includes encrypting the key store content, at the key service provider, using encryption key data provided by the given user device or by the key service provider.

According to an embodiment of the present disclosure, the method includes protecting the key store, at the given user device, using a token of the end user's bio-credential. Optionally, in this regard, the end user's bio-credential includes at least one of: a fingerprint of the end user, facial features of the end user, a DNA profile of the end user, iris recognition of the end user, a walking manner of the end user, a writing manner of the end user, a heartbeat pattern of the end user. It will be appreciated that the end user's bio-credential used for protecting the key store are provided by way of hardware-based functionalities of the end user's device. These hardware-based functionalities may, for example, be implemented by way of TEE. As an example, the facial features of the end user could be captured using a camera of the end user's device and verified against a reference template using image correlation or use of neural network algorithms. It will be appreciated that the end user's bio-credential may alternatively correspond to any other type of biometrical verification feasible in the future.

According to another embodiment of the present disclosure, the method includes protecting the key store, at the given user device, using a personal identification code (PIN) associated with the end user. It will be appreciated that the PIN is provided by way of the hardware-based functionalities of the end user's device.

According to yet another embodiment of the present disclosure, the method includes protecting the key store, at the given user device, using an application-specific identification (ID). Optionally, the application-specific ID is provided by way of the hardware-based functionalities of the end user's device. Alternatively, optionally, the application-specific ID is provided by way of platform-based functionalities. Optionally, in such a case, the application-specific ID is an instance identifier (namely, instanceID).

Furthermore, according to an embodiment of the present disclosure, the key store content is received at the step (i) via unsecured transportation. As an example, the encrypted key store content can be communicated via non-secured public Internet connection, because when properly-protected the encrypted key store content does not reveal any user-sensitive data. This is possible because the key materials are protected using encryption, and therefore, the transportation of the key materials is not necessary to be protected.

In a second aspect, embodiments of the present disclosure provide a computer program product comprising a non-transitory computer-readable storage medium having computer-readable instructions stored thereon, the computer-readable instructions being executable by a computerized device comprising processing hardware to execute the method pursuant to the aforementioned first aspect.

Optionally, the computer-readable instructions are downloadable from a software application store, for example, from an "App store" to the computerized device.

In a third aspect, embodiments of the present disclosure provide a system for protecting usage of key store content at a given user device of an end user, characterized in that the system is operable to:

(i) receive, at the given user device, the key store content including key materials that are encrypted using encryption credentials compatible with the given user device, the key store content being created by and received from a key service provider in a format that is compatible with the given user device;

(ii) import the encrypted key materials of the key store content to a protected key store of the given user device and store the key materials at the protected key store in the encrypted form, wherein all the key encrypted materials of the key store content are imported at one go, wherein the key store content is stored at the key store in a manner that the key materials are non-exportable from the key store, and wherein keys are generated from the encrypted key materials using:
  key offsets,
  bit offsets, and/or
  byte offsets; and (iii) internally within the protected key store of the given user device, allow one or more key store integrated services of the given user device to access the non-exportable key materials for use via key references only.

Optionally, in addition to the key materials, the protected key store also includes information about the end user and/or a group of end users that are authorized to use the key materials stored at the protected key store. Additionally or alternatively, optionally, the protected key store includes other information relevant for usage of the key materials.

Optionally, the key materials are received at (i) in a symmetrically-encrypted form.

Optionally, the system is operable to, internally within the protected key store of the given user device, decrypt one or more of the key materials to be used by the one or more key store integrated services of the given user device.

According to an embodiment, the key references are implemented by way of indices of the key materials. Optionally, the system is operable to receive, within the key store content, the indices to be used for referencing the key materials via the key references. Alternatively, optionally, the system is operable to generate, at the given user device, the indices to be used for referencing the key materials via the key references. As an example, the indices may be generated in a consecutive manner corresponding to an order in which the key materials are included in the key store content. The indices can be generated, for example, at an initial registration of the given user device to the key service provider or during the decryption of the key materials.

According to another embodiment, the key references are implemented by way of offsets based upon which the key materials are to be identified.

Optionally, when importing at (ii), the system is operable to import the key store content to the given user device as a single data file.

It will be appreciated here that embodiments of the present disclosure are suitable for various different types of user devices. Examples of such user devices include, but are not limited to, mobile phones, smart telephones, MIDs, tablet computers, UMPCs, phablet computers, PDAs, web pads, PCs, handheld PCs, laptop computers, desktop computers, and interactive entertainment devices, such as game consoles, TV sets and STBs.

According to an embodiment of the present disclosure, the key store is hardware-based. Optionally, in such a case, when importing at (ii), the system is operable to bind the key materials stored at the hardware-based key store to a secure area of processing hardware of the given user device.

Optionally, the secure area of the processing hardware is implemented by way of dedicated hardware that is configured to disallow externally-loaded software applications or programs to operate on the dedicated hardware; for example software applications that are externally loaded are operable to interface via key store integrated services provided by trusted software applications that are protected by the kernel layer of the end user's device, wherein the key store integrated services shield the key store from direct access by the externally loaded software applications. It will be appreciated that such externally-loaded software applications or programs could be maliciously loaded by hostile third parties. However, it will be appreciated that the key store integrated services are implemented using trusted software applications provided from a trusted software service provider, as aforementioned. More optionally, the secure area of the processing hardware is implemented by way of TEE (see reference [1]).

According to an embodiment of the present disclosure, the "key materials" include at least one of:
(a) secret keys for symmetric data encryption,
(b) private keys and public keys for a PKI-equivalent usage,
(c) certificates to be used for cryptography, signing, integrity, verification, authentication, authorization and similar,
(d) one or more key generators for generating keys.

Moreover, according to an embodiment of the present disclosure, the system is operable to integrate, with the key store, one or more trusted software applications or ecosystem processes hosted at the given user device that are authorized to use the key store of the given user device. Examples of such key store integrated services include, but are not limited to, data delivery services, content delivery services, banking services, and financial transaction services.

Optionally, in this regard, the system is operable to import, from a trusted software service provider, the one or more trusted software applications for providing key store integrated services, wherein the one or more trusted software applications when executed at the given user device are operable to provide one or more key store integrated services and are provided with protection from a kernel of the given user device.

Furthermore, according to an embodiment of the present disclosure, the key service provider is operable to encrypt the key store content using encryption key data provided by the given user device or by the key service provider.

According to an embodiment of the present disclosure, the key store is protected at the given user device using a token of the end user's bio-credential. Optionally, in this regard, the end user's bio-credential includes at least one of: a fingerprint of the end user, facial features of the end user, a DNA profile of the end user, iris recognition of the end user, a walking manner of the end user, a writing manner of the end user, a heartbeat pattern of the end user. It will be appreciated that the end user's bio-credential may alternatively correspond to any other type of biometrical verification feasible in the future.

According to another embodiment of the present disclosure, the key store is protected at the given user device using a PIN associated with the end user.

According to yet another embodiment of the present disclosure, the key store is protected at the given user device using an application-specific ID.

Optionally, the key service provider is operable to encrypt the key materials by employing symmetric AES encryption (see reference [2]), for example, using a 128-bit key or a 256-bit key.

Moreover, according to an embodiment of the present disclosure, when receiving at (i), the system is operable to receive the key store content via unsecured transportation.

Next, embodiments of the present disclosure will be described with reference to figures.

Referring to FIG. 1A, there is provided a schematic illustration of a system 100 for protecting usage of key store content 102, in accordance with an embodiment of the present disclosure. The system 100 includes a key service provider 104 and a given user device 106 of an end user, wherein the key service provider 104 and the given user device 106 are coupled in communication via a data communication arrangement.

The key service provider 104 creates the key store content 102 in a format that is compatible with the given user device 106, encrypts key materials included in the key store content 102, and sends the key store content 102 to the given user device 106. Optionally, the key store content 102 is importable to a protected key store 108 of the given user device 106 as a single data file.

At the given user device 106, the key store content 102 (namely, all the key materials) is imported to the protected key store 108 of the given user device 106 at one go, wherein the key materials are stored in the encrypted form and in a manner that the key materials are non-exportable from the protected key store 108, and are accessible for use by key store integrated services via key references only.

As described earlier, the key references may be implemented by way of indices or offsets. Optionally, the indices are received in the key store content 102; alternatively, optionally, the indices are generated at the given user device 106, for example in a consecutive manner corresponding to an order in which the key materials are included in the key store content 102.

A trusted software service provider 120 provides one or more trusted software applications 122 that are imported in encrypted form to the protected key store 108 of the given user device 106, wherein the one or more trusted software applications 122 are executable upon the given user device 106 in a manner that is protected by a kernel 124, for example a kernel layer, of the given user device 106. The one or more trusted software applications 122 are operable to use the key references to access the key materials of the key store 108 for various purposes, for example encryption, decryption, verification, authentication, but are prevented from divulging the key materials to other software applications that are supported in one or more software layers of the given user device 106.

As the key materials are stored in the encrypted form, the key materials are required to be decrypted prior to use. Optionally, the encrypted key materials are decrypted securely within the key store 108, when loading the key materials to the key store 108.

Optionally, the trusted software service provider 120 is a same party as the key service provider 104. Alternatively, optionally, the trusted software service provider 120 is a mutually different party to the key service provider 104.

Figure 1B:
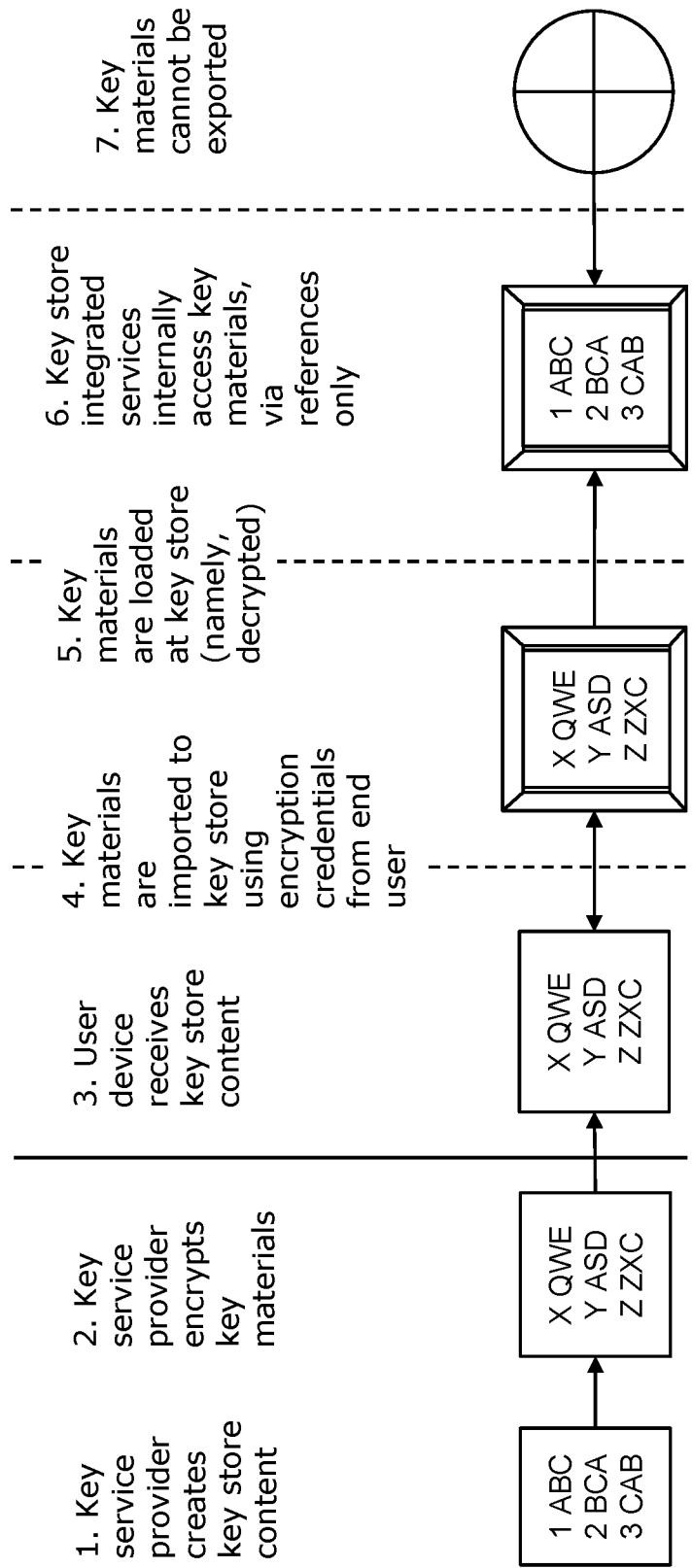
FIG. 1B is a schematic illustration of a complete end-to-end process flow of protecting the usage of the key store content at the given user device, in accordance with an embodiment of the present disclosure.
Figure 1C:
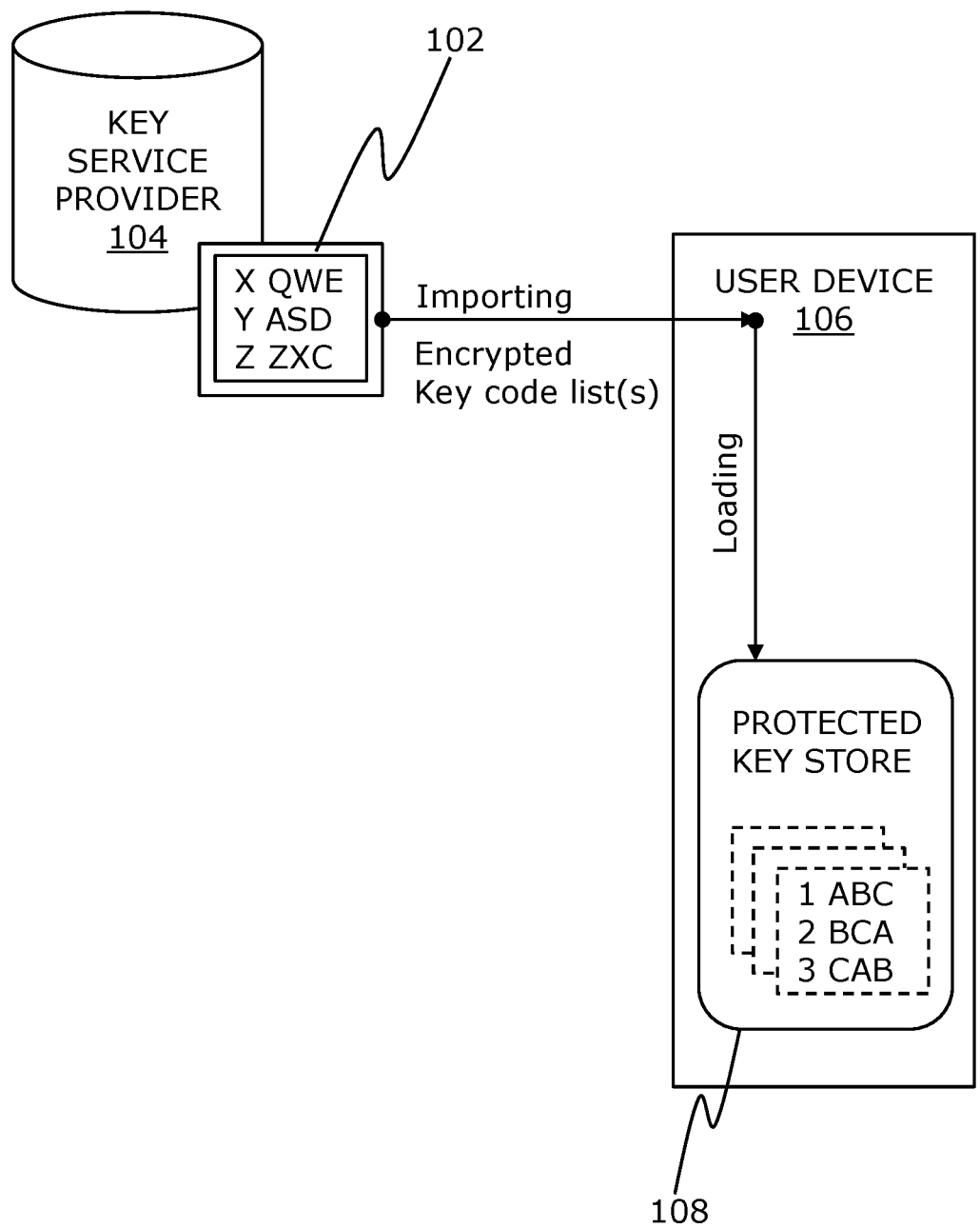
FIG. 1C is a schematic illustration of how the key store content is imported and loaded to a protected key store of the given user device, in accordance with an embodiment of the present disclosure.

In FIG. 1B, there is provided a schematic illustration of a complete end-to-end process flow of protecting the usage of the key store content 102 at the given user device 106, in accordance with an embodiment of the present disclosure.

Step 1: The key service provider 104 creates the key store content 102 in the format that is compatible with the given user device 106.

Step 2: The key service provider 104 encrypts the key materials included in the key store content 102.

Step 3: The given user device 106 receives the key store content 102 from the key service provider 104.

Step 4: The encrypted key materials are imported to the protected key store 108 of the given user device 106. Optionally, the key store 108 is protected using encryption credentials from the end user.

Step 5: The key materials are loaded to the key store, wherein the key materials are decrypted securely within the key store, in order to enable easy and fast usage thereof.

Step 6: The key store integrated services 122 access the key materials, internally within the protected key store, via key references only.

Prohibited step 7: The key materials are non-exportable, and cannot be exported from the key store 108.

Furthermore, in FIG. 10, there is provided a schematic illustration of how the key store content 102 is imported and loaded to the protected key store 108, in accordance with an embodiment of the present disclosure.

Upon receiving the key store content 102 from the key service provider 104, the encrypted key materials included therein are imported to the protected key store 108 of the user device 106 at one go.

Notably, the key materials may be provided as a single key code list or as a plurality of different key code lists. It will be appreciated that different key code lists can be imported simultaneously. Irrespective of the form in which different key code lists, namely the key materials, are encrypted, all the key materials are imported at one go.

The encrypted key materials are then decrypted securely within the key store 108, when the key materials are loaded at the key store 108.

FIGS. 1A, 1B and 10 are merely examples, which should not unduly limit the scope of the claims herein. It is to be understood that the specific designation for the system 100 is provided as an example and is not to be construed as limiting the system 100 to specific numbers, types, or arrangements of service providers and user devices; specifically, a single user device has been shown for the sake of simplicity only. A person skilled in the art will recognize many variations, alternatives, and modifications of embodiments of the present disclosure.

It will be appreciated that even though FIGS. 1B and 10 show the indices of the key materials, the key references are not necessarily always implemented by way of such indices. Notably, in alternative implementations, the key references can be implemented using offsets, as described earlier.

Figure 2:
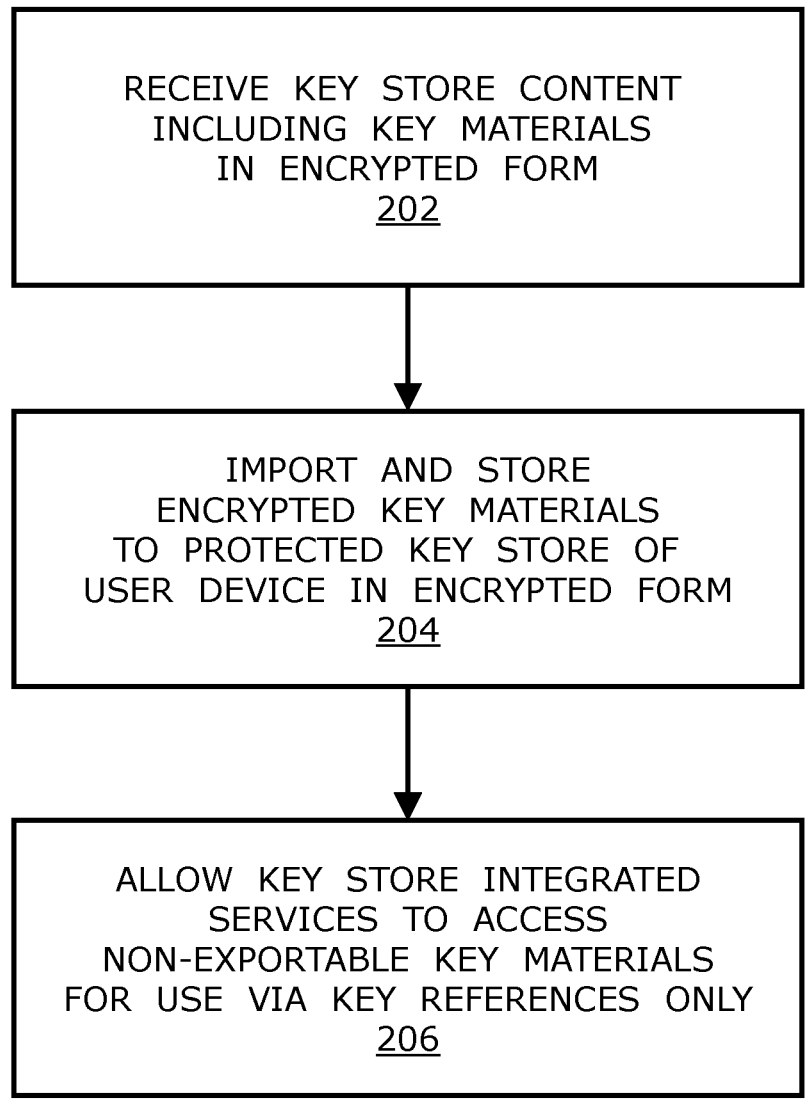
FIG. 2 is a flow chart depicting steps of a method of protecting usage of key store content at a given user device of an end user, in accordance with an embodiment of the present disclosure.

Referring next to FIG. 2, there is provided a flow chart depicting steps of a method of protecting usage of key store content at a given user device of an end user, in accordance with an embodiment of the present disclosure. The method is depicted as a collection of steps in a logical flow diagram, which represents a sequence of steps that can be implemented in hardware, software, or a combination thereof, for example as aforementioned.

At a step 202, the key store content is received at the given user device. In accordance with the step 202, the key store content includes key materials that are encrypted using encryption credentials compatible with the given user device. The key store content is created by and received from a key service provider in a format that is compatible with the given user device.

At a step 204, the encrypted key materials of the key store content are imported to a protected key store of the given user device at one go, and the key materials are stored at the protected key store in the encrypted form. In accordance with the step 204, the key store content is stored at the protected key store in a manner that the key materials are non-exportable from the key store.

At a step 206, internally within the protected key store of the given user device, one or more key store integrated services of the given user device are allowed to access the non-exportable key materials for use, via key references only. As aforementioned, such integrated services are provided by executable software that is run within protection of the kernel layer, for example a kernel structure, of the given user device. Optionally, the kernel structure includes hardware, for achieving an enhanced degree of security.

The steps 202 to 206 are only illustrative and other alternatives can also be provided where one or more steps are added without departing from the scope of the claims herein.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural; as an example, "at least one of" indicates "one of" in an example, and "a plurality of" in another example; moreover, "two of", and similarly "one or more" are to be construed in a likewise manner. Numerals included within parentheses in the accompanying claims are intended to assist understanding of the claims and should not be construed in any way to limit subject matter claimed by these claims.

The phrases "in an embodiment", "according to an embodiment" and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

We claim:

1. A method of protecting usage of key store content at a given user device of an end user, the method comprising:
   (i) receiving, at the given user device, the key store content including key materials that are encrypted using encryption credentials compatible with the given user device, the key store content being created by and received from a key service provider in a format that is compatible with the given user device, wherein the encrypted key materials are provided as a key code list;
   (ii) importing the encrypted key materials of the key store content to a protected key store of the given user device and storing the encrypted key materials at the protected key store in the encrypted form, wherein all of the encrypted key materials of the key store content are imported to the protected key store at one go, and wherein the key store content is stored at the protected key store in a manner that the encrypted key materials are non-exportable from the protected key store, and wherein keys are generated from the encrypted key materials comprising:
      decrypting the encrypted key materials to obtain the key code list, and
      generating keys by choosing the keys from the key code list using byte offsets, wherein offsets for the byte offsets are selected in any predefined order; and
   (iii)_internally within the protected key store of the given user device, allowing one or more key store integrated services of the given user device to access the non-exportable encrypted key materials for use via key references only.

2. The method of claim 1, wherein the method includes, internally within the protected key store of the given user device, decrypting one or more of the encrypted key materials to be used by the one or more key store integrated services of the given user device.

3. The method of claim 1, wherein at the step (ii), the key store content is imported to the protected key store as a single data file.

4. The method of claim 1, wherein the method includes receiving, within the key store content, indices to be used for referencing the encrypted key materials via the key references.

5. The method of claim 1, wherein the method includes generating, at the given user device, indices to be used for referencing the encrypted key materials via the key references.

6. The method of claim 1, wherein the key references are implemented by way of offsets based upon which the encrypted key materials are to be identified.

7. The method of claim 1, wherein the protected key store is hardware-based, and the importing at the step (ii) includes binding the encrypted key materials stored at the hardware-based key store to a secure area of processing hardware of the given user device.

8. The method of claim 1, wherein the method includes integrating, with the protected key store, one or more trusted software applications or ecosystem processes hosted at the given user device that are authorized to use the protected key store of the given user device.

9. The method of claim 8, wherein the method includes importing, from a trusted software service provider, the one or more trusted software applications for providing key store integrated services, wherein the one or more trusted software applications when executed at the given user device are operable to provide one or more key store integrated services and are provided with protection from a kernel of the given user device.

10. The method of claim 1, wherein the method includes encrypting the key store content, at the key service provider, using encryption key data provided by the given user device or by the key service provider.

11. The method of claim 1, wherein the method includes protecting the protected key store, at the given user device, using a token of a bio-credential of the end user.

12. The method of claim 11, wherein the bio-credential of the end user includes at least one of: a fingerprint of the end user, facial features of the end user, a DNA profile of the end user, iris recognition of the end user, a walking manner of the end user, a writing manner of the end user, a heartbeat pattern of the end user.

13. The method of claim 1, wherein the encrypted key materials are received at the given user device at the step (i) in a symmetrically-encrypted form.

14. The method of claim 13, wherein the method includes encrypting key materials at the key service provider by employing symmetric Advanced Encryption Standard (AES) encryption.

15. The method claim 1, wherein the key store content is received at the step (i) via unsecured transportation.

16. The method of claim 1, wherein the encrypted key materials include at least one of:
   (a) secret keys for symmetric data encryption,
   (b) private keys and public keys for a Public Key Infrastructure (PKI)-equivalent usage,
   (c) certificates to be used for cryptography, signing, integrity, verification, authentication, authorization,
   (d) one or more key generators for generating keys.

17. The method of claim 1, further comprising generating keys from the encrypted key materials using key offsets, wherein offsets are increased by a size of the keys.

18. A computer program product comprising . . .
   internally within the protected key store of the given user device, allow one or more key store integrated services of the given user device to access the non-exportable encrypted key materials for use via key references only.

19. A system for protecting usage of key store content . . .
   (iii) internally within the protected key store of the given user device, allow one or more key store integrated services of the given user device to access the non-exportable encrypted key materials for use via key references only.

20. The system of claim 19, wherein execution of the machine readable instructions by the hardware processor is further configured to cause the system to, internally within the protected key store of the given user device, decrypt one or more of the encrypted key materials to be used by the one or more key store integrated services of the given user device.

21. The system of claim 19, wherein when importing at (ii), the system is configured to import the key store content as a single data file.

22. The system of claim 19, wherein execution of the machine readable instructions by the hardware processor is further configured to cause the system to receive, within the key store content, indices to be used for referencing the encrypted key materials via the key references.

23. The system of claim 19, wherein execution of the machine readable instructions by the hardware processor is further configured to cause the system to generate, at the given user device, indices to be used for referencing the encrypted key materials via the key references.

24. The system of claim 19, wherein the key references are implemented by way of offsets based upon which the encrypted key materials are to be identified.

25. The system of claim 19, wherein the protected key store is hardware-based, and when importing at (ii), the execution of the machine readable instructions by the hardware processor is further configured to cause the system to bind the encrypted key materials stored at the hardware-based protected key store to a secure area of processing hardware of the given user device.

26. The system of claim 19, wherein execution of the machine readable instructions by the hardware processor is further configured to cause the system to integrate, with the protected key store, one or more trusted software applications or ecosystem processes hosted at the given user device that are authorized to use the protected key store of the given user device.

27. The system of claim 26, wherein execution of the machine readable instructions by the hardware processor is further configured to cause the system to import, from a trusted software service provider, the one or more trusted software applications for providing key store integrated services, wherein the one or more trusted software applications when executed at the given user device are configured to provide one or more key store integrated services and are provided with protection from a kernel of the given user device.

28. The system of claim 19, wherein execution of the machine readable instructions by the hardware processor is further configured to cause the key service provider to encrypt the key store content using encryption key data provided by the given user device or by the key service provider.

29. The system of claim 19, wherein the protected key store is protected at the given user device using a token of a bio-credential of the end user.

30. The system of claim 29, wherein the bio-credential of the end user includes at least one of: a fingerprint of the end user, facial features of the end user, a DNA profile of the end user, iris recognition of the end user, a walking manner of the end user, a writing manner of the end user, a heartbeat pattern of the end user.

31. The system of claim 19, wherein the encrypted key materials are received at the given user device at (i) in a symmetrically-encrypted form.

32. The system of claim 31, wherein execution of the machine readable instructions by the hardware processor is further configured to cause the key service provider to encrypt key materials by employing symmetric Advanced Encryption Standard (AES) encryption.

33. The system of claim 19, wherein when receiving at (i), execution of the machine readable instructions by the hardware processor is further configured to cause the system to receive the key store content via unsecured transportation.

34. The system of claim 19, wherein the encrypted key materials include at least one of:
(a) secret keys for symmetric data encryption,
(b) private keys and public keys for a Public Key Infrastructure (PKI)-equivalent usage,
(c) certificates to be used for cryptography, signing, integrity, verification, authentication, authorization,
(d) one or more key generators for generating keys.

\* \* \* \* \*